(12) United States Patent
Thanasiu et al.

(10) Patent No.: US 7,997,063 B2
(45) Date of Patent: Aug. 16, 2011

(54) CONTROLLED AIR-FUEL RATIO MODULATION AIR FUEL SENSOR INPUT

(75) Inventors: Eva Thanasiu, Trenton, MI (US); Christian Thomas Goralski, Jr., St. Paul, MN (US); Robert Joseph Jerger, Dexter, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 601 days.

(21) Appl. No.: 11/926,382

(22) Filed: Oct. 29, 2007

(65) Prior Publication Data

US 2009/0107113 A1    Apr. 30, 2009

(51) Int. Cl.
*F01N 3/00* (2006.01)

(52) U.S. Cl. ......... 60/276; 60/274; 60/277; 60/285; 123/1 A; 123/406.3; 123/406.31; 701/103; 701/109

(58) Field of Classification Search ............ 60/274, 60/276, 277, 284, 285, 299; 123/1 A, 1 R, 123/406.3, 406.31; 701/103, 109
See application file for complete search history.

(56) References Cited

U.S. PATENT DOCUMENTS

| | | | | |
|---|---|---|---|---|
| 5,311,852 A * | 5/1994 | Yoshida et al. | ........... | 123/674 |
| 5,417,060 A * | 5/1995 | Ishida et al. | ........... | 60/276 |
| 5,682,854 A | 11/1997 | Ozawa | | |
| 5,839,274 A * | 11/1998 | Remboski et al. | ........... | 60/274 |
| 6,052,989 A * | 4/2000 | McCabe et al. | ........... | 60/285 |
| 6,109,025 A | 8/2000 | Murata et al. | | |
| 6,195,986 B1 | 3/2001 | Davey et al. | | |
| 6,199,373 B1 * | 3/2001 | Hepburn et al. | ........... | 60/274 |
| 6,347,619 B1 | 2/2002 | Whiting et al. | | |
| 6,397,583 B1 * | 6/2002 | Davey et al. | ........... | 60/277 |
| 6,532,734 B1 | 3/2003 | Nader et al. | | |
| 6,681,564 B2 | 1/2004 | Nishiyama et al. | | |
| 6,786,041 B2 | 9/2004 | Itoh et al. | | |
| 6,804,951 B2 | 10/2004 | Nader et al. | | |
| 6,901,746 B2 | 6/2005 | Nishiyama et al. | | |
| 7,043,914 B2 | 5/2006 | Ishikawa | | |
| 2003/0110760 A1 | 6/2003 | Shirakawa | | |
| 2004/0098967 A1 | 5/2004 | Cook et al. | | |
| 2008/0115486 A1 | 5/2008 | Yurgil | | |

FOREIGN PATENT DOCUMENTS

| | | |
|---|---|---|
| DE | 102007054612 | 6/2008 |
| EP | 1329626 | 7/2003 |
| EP | 1681448 | 7/2006 |
| GB | 2418264 | 3/2006 |

OTHER PUBLICATIONS

ISA Intellectual Property Office, United Kingdom, International Search Report of GB 0819672.7, 1 page.

* cited by examiner

*Primary Examiner* — Binh Q Tran (74) *Attorney, Agent, or Firm* — Julia Voutyras; Alleman Hall McCoy Russell & Tuttle LLP (57) ABSTRACT

A method is described for identifying fuel composition from an index ratio of oxygen sensors upstream and downstream of a catalyst of the engine. Different index ratios are achieved for different fuel compositions, and thus it is possible to identify fuel composition, such as fuel alcohol content, based on changes in the index ratio.

18 Claims, 7 Drawing Sheets

CONTROLLED AIR-FUEL RATIO MODULATION AIR FUEL SENSOR INPUT

BACKGROUND AND SUMMARY

Engines with catalytic converters typically include Exhaust Gas Oxygen (EGO) sensors for on-board catalyst monitoring. For engines capable of utilizing multiple fuel types, the EGO sensors can provide feedback to determine conversion efficiencies of the catalytic converter for exhausts from the fuel delivered.

One prior approach for monitoring the performance of a catalytic converter involves comparing a ratio indicative of catalytic converter exhaust gas conversion efficiency determined from upstream and downstream exhaust gas sensor signals to a ratio threshold value that is indicative of a malfunctioning catalytic converter and that is adaptively adjusted in dependence on the current composition of a first and second fuel. As a result, a degraded catalyst can be identified in engines utilizing multiple fuels.

The inventors have recognized that rather than, or in addition to, adjusting a threshold ratio with fuel composition, information related to the sensor ratios may be used to identify or further estimate fuel composition, such as ethanol content and/or sulfur content. In one example, the inventors have provided systems and methods for identifying a composition of fuel based on information from front and rear exhaust oxygen sensors, where the composition may include a concentration of a constituent in fuel combusted upstream of the catalyst.

DETAILED DESCRIPTION OF EXAMPLE EMBODIMENT(S)

Figure 1:
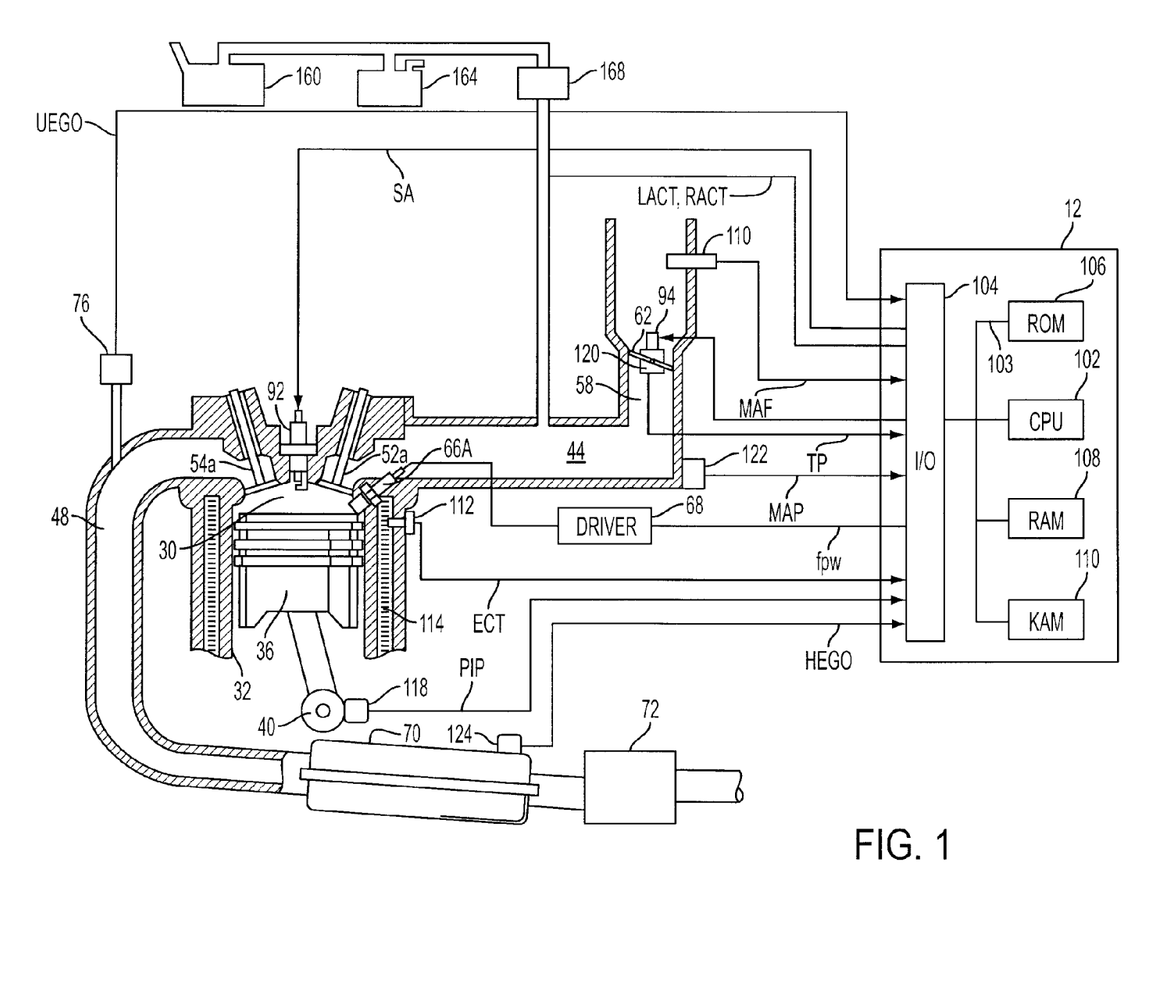
FIG. 1 is an exemplary embodiment of an engine.

FIG. 1 shows an embodiment of an internal combustion engine 10 for use in an on or off-road passenger vehicle. While one cylinder, as well as an intake path, exhaust path connected to that cylinder, are illustrated, it will be appreciated that the depicted engines may include four, six, eight, ten, or more or less cylinders, and may be of inline, opposed, V or other configurations. In FIG. 1, a direct injection spark ignited internal combustion engine 10 is shown, which includes a plurality of combustion chambers, and is controlled by electronic engine controller 12. The internal combustion engine 10 may include alternately or in addition a port fuel injector coupled to intake manifold 44, rather than directly cylinder 30.

Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown fluidically communicating with intake manifold 44 and exhaust manifold 48 via respective intake valves 52a and exhaust valves 54a. Fuel injector 66A is shown directly coupled to combustion chamber 30 for delivering injected fuel directly therein in proportion to the pulse width of signal fpw received from controller 12 via electronic driver 68. Fuel is delivered to fuel injector 66A by a high pressure fuel system including fuel tank 160, fuel vapor storage canister 164, purge control valve 168, and associated fuel pumps and fuel rail.

Engine 10 may operate on a plurality of substances, which may be stored and delivered via the high pressure fuel system. As such, the fuel system may include various other fuel tanks in addition to fuel tank 160. Further, the fuel system may include alcohol separator units, control and/or mixing valves, and injectors. Specifically, the various substances in fuel system may include multiple different fuel blends, injection locations, or various other alternatives. Further, the relative amounts and/or ratios of the different substances may be variably controlled by a controller 12 in response to operating conditions during engine operation, where the various operating conditions may be provided via sensor(s), or internally determined in controller 12, or combinations thereof, as described herein.

In some embodiments, multiple different substances having different gasoline and/or alcohol and/or water concentrations may be delivered to the engine, and may be delivered in a mixed state, or separately delivered. In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

Alternately or in addition, different injector locations may be used for different substances. For example, a single injector (such as a direct injector) may be used to inject a mixture of two substances (e.g., gasoline and an alcohol/water mixture), where the relative amount or ratio of the two substances in the mixture may be varied during engine operation via adjustments made by controller 12 via a mixing valve (not shown), for example. In still another example, at least two different injectors for one or more cylinders may be used, such as port and direct injectors, each injecting a different substance in different relative amounts as operating conditions vary. In even another example, different sized injectors, in addition to different locations and different substances, may be used. In yet another example, two port injectors with different spray patterns and/or aim points may be used with different injection timing to deliver different mixture of at least two substances to the cylinder.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration may be referred to as electronic throttle control (ETC), which may also be utilized during idle speed control.

Distributorless ignition system 88 provides ignition spark to combustion chamber 30 via spark plug 92 in response to spark advance signal SA from controller 12. Also, in the exemplary embodiment described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

Front exhaust gas oxygen (EGO) sensor 76 is shown coupled to exhaust manifold 48 upstream of catalytic converter 70 and may hereinafter be referred to as the "front EGO sensor" 76. The front EGO sensor 76 outputs a signal that is used to control the air-fuel ratio, as described below.

Catalytic converter 70 may be a three-way catalytic converter (hereinafter referred to as the "TWC"). Catalytic converter 70 may include precious metal components, (e.g., platinum, palladium, rhodium, etc.) to facilitate the reduction of nitrogen oxides (NOx) and/or the oxidation of carbon monoxide (CO) and hydrocarbons (HC) based on engine operation. In addition, a sulfur-holding component, such as nickel oxide, may be provided in the TWC to absorb hydrogen sulfide ($H_2S$) produced from sulfur in the exhaust and/or release sulfur dioxide ($SO_2$) based on engine operation. However, it may be desirable to include non nickel-containing catalysts (e.g., alumina, cerium-oxide, boron oxide, etc.) in catalytic converter 70 to reduce potentially negative environmental and/or carcinogenic effects. Nitrogen oxide (NOx) adsorbent or trap 72 is also shown positioned downstream of the TWC, although the NOx trap 72 may be integrated in catalytic converter 70.

A rear exhaust gas oxygen (EGO) sensor 124 may be provided adjacent catalytic converter 70 or elsewhere downstream of the catalyst, such as intermediate catalytic converter 70 and emission control device 72 (which can be a NOx trap) or adjacent the emission control device 72, and may hereinafter be referred to as the "rear EGO sensor" 124. It may be appreciated that the EGO sensors may include a linear or universal exhaust gas oxygen (UEGO) sensor which provides a substantially linear output versus exhaust air-fuel ratio, a switching type sensor, such as a heated exhaust gas oxygen (HEGO) sensor, various other exhaust gas sensors, or any combination thereof. Note that the above embodiment is just one example of an upstream sensor and a downstream sensor in relation to an emission control device. Additional catalytic device may be placed between the sensors, upstream of the sensors, downstream of the sensors, or others. Further, additional sensors may be placed between, upstream, or downstream of the sensors and/or emission control device. While the above example describes example oxygen sensors, various types of air-fuel ratio sensors may be used.

Controller 12 typically includes a processing unit 102, and a data bus 103 linking the processing unit to input/output ports 104 and associated memory. The memory may include non-volatile memory for storing executable programs, calibration values, etc., such as read only memory 106 and keep alive memory 110, as well as volatile memory such as random access memory 108, which may be used by processing unit 102 during execution of stored programs.

Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal (MAP) from sensor 122. Engine speed signal RPM is generated by controller 12 from signal PIP in a conventional manner and manifold pressure signal MAP from a manifold pressure sensor provides an indication of vacuum, or pressure, in the intake manifold.

Controller 12 may be configured to further vary engine operation for use with various fuels. In particular, engine operation may be varied based on a composition of fuel delivered to the engine 10. To determine the concentration of the fuel, controller 12 may rely on feedback from the sensors to detect operating conditions that may indicate the combustion of certain concentrations and/or levels of constituents, such as alcohol and/or sulfur, in the fuel. In one embodiment, operation of the TWC may vary based on the composition of fuel delivered to the engine 10. In particular, the oxidation and/or reduction reactions in the TWC may proceed at conversion efficiencies that may depend on the concentration of various constituents in the exhaust stream from the engine 10. As such, the concentration of fuel constituents combusted in the engine 10 may be determined based on feedback from sensors disposed upstream and downstream of the TWC, such as described in further detail with respect to FIG. 2.

Figure 2:
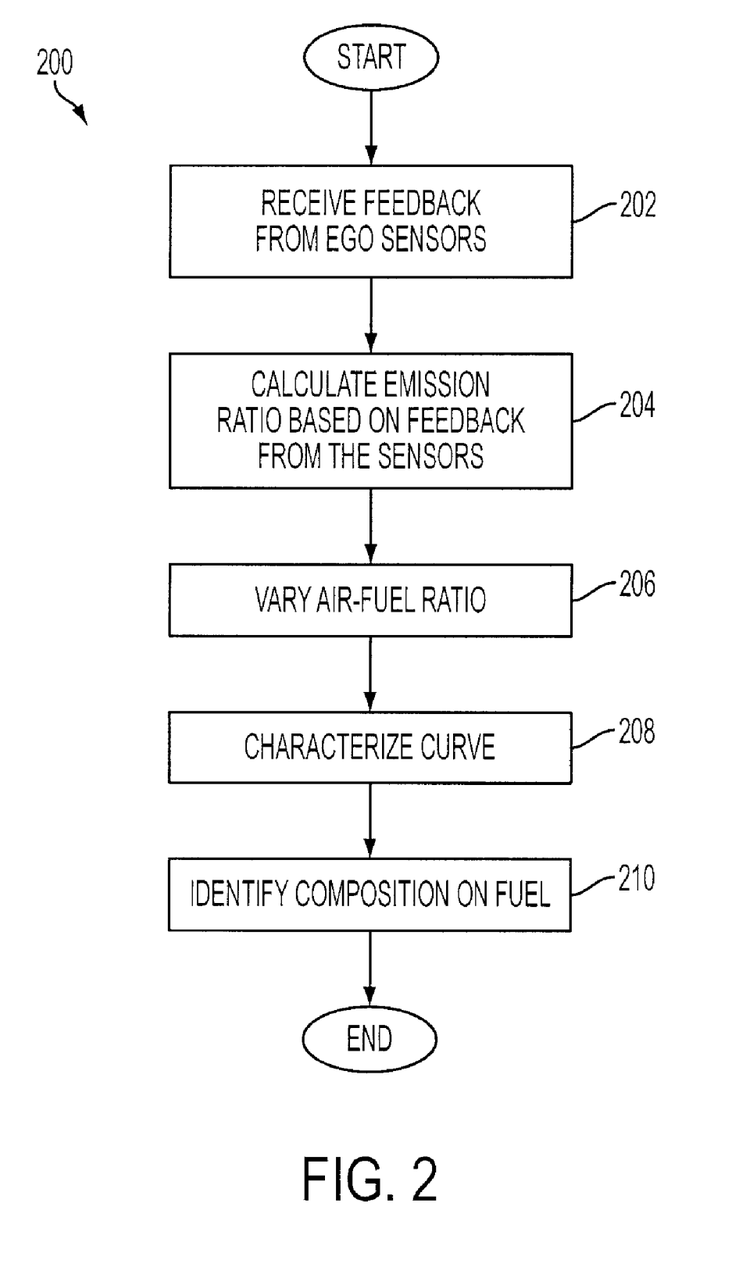
FIG. 2 is a flowchart of an exemplary process for identifying a composition of fuel.

FIG. 2 is a flowchart of an exemplary process for determining a composition of fuel based on feedback from the front and rear EGO sensors. In previous approaches, fuel composition may be indicated via a sensor, such as a fuel quality sensor. Further, in still other approaches, fuel composition may be identified from a shift in the stoichiometric air-fuel ratio, which could be identified via correlation to fuel injector flow and mass air-flow under feedback air-fuel ratio operation. While such approaches may be used, they may be erroneous, or they may produce errors, at least under some conditions. Thus, an alternative approach, which may be used in addition or in place of the above or other approaches, is described herein.

Generally, method 200 may identify a composition of fuel combusted in the engine based on oxygen content of an exhaust stream upstream and downstream of the TWC. In particular, output signals received at the controller may be used to calculate an emission ratio for the combusted fuel at a particular air-fuel ratio for the engine. A curve may be characterized from emission ratios calculated at a plurality of air-fuel ratios for the engine to identify the composition of the combusted fuel. In this way, variation in the catalyst performance, as identified via the upstream and downstream air-fuel ratio sensors, may be used to correlate the catalyst performance across air-fuel ratios to indicate fuel composition.

The term "emission ratio" may hereinafter refer to a ratio comparing the output signals of an exhaust gas oxygen sensor downstream of an emission control device to the output signals of an exhaust gas oxygen sensor upstream of the device to indicate the conversion efficiency of the device at a particular air-fuel ratio. Various ratios may be used. Alternatively, other correlation between upstream/downstream sensors, and catalyst performance, may be used.

Beginning at 202, method 200 includes receiving feedback from the EGO sensors. The front EGO sensor 76 and the rear EGO sensor 124 each send an output signal to controller 12. The output signals may include UEGO and/or HEGO signals, as examples, corresponding to oxygen concentration upstream and downstream of the TWC.

Continuing to 204, method 200 includes calculating an emission ratio from the output signals from the front and rear EGOs. In particular, the emission ratio may indicate a conversion efficiency of the TWC based on the output signal of the front sensor 76 relative to the output signal of the rear sensor 124. As demonstrated in FIG. 3-6 and described in detail below, the calculated emission ratio varies with the air-fuel ratio for the engine. As such, the emission ratio may be calculated for a particular air-fuel ratio, or air-fuel ratio range, for the engine.

In one embodiment, the sum of the output signal length from the rear EGO sensor 124 may be compared to the sum of the output signal length from the front EGO sensor 76 to determine an index ratio. The index ratio may be a UEGO index ratio calculated from UEGO signals received from the front and rear EGO sensors or may be a HEGO index ratio calculated, alternately or in addition to the UEGO index ratio, from HEGO signals. The index ratio may hereinafter refer to a ratio based on an instantaneous incremental arc length and/or accumulated series of incremental arc lengths of the rear EGO sensor 124 divided by the instantaneous incremental arc length and/or accumulated series of incremental arc lengths of the front EGO sensor 76 signal. It may be appreciated that the index ratio may determine the conversion efficiency of the TWC at a particular air-fuel ratio with increased sensitivity to degradations of the TWC as a result of the incorporation of a time-based component of the sensor signal.

Next, method 200 continues to 206, which includes varying the air-fuel ratio for the engine. The air-fuel ratio may be varied to maximize or minimize certain functions, for example, and/or may be varied based on instructions to determine the composition of the fuel, as prompted by the controller 12, for example. As such, emission ratios may be calculated in a manner similar to that described in 204 at each of a plurality of air-fuel ratios as the air-fuel ratio varies. The calculated emission ratios may be stored at the memory of controller 12, for example.

At 208, a curve including calculated emission ratios at the plurality of air-fuel ratios may be characterized to define various features. The features of the curve may generally indicate the conversion efficiency of the TWC. In some embodiments, the calculated emission ratios may be fit to a polynomial function curve. The curve may be a UEGO curve based on UEGO output signals from the sensors or may be a HEGO curve based on HEGO output signals. It may be appreciated that a UEGO curve may define a minimum emission ratio feature and a HEGO curve define a maximum rate of change feature. The term "minimum emission ratio" may hereinafter refer to a minimum calculated emission ratio in a UEGO curve, and the term "maximum rate-change emission ratio" may refer to the emission ratio defined at the maximum rate of change in a HEGO curve. In addition, various other features may also be defined by the curve, such as a range of air-fuel ratios of the curve, as described below.

Continuing to 210, method 200 includes identifying a composition of fuel based on one or more features of the curve. Specifically, such feature of the curve (e.g., minimum emission ratio, maximum rate-change emission ratio, etc.) may be correlated to that feature in a curve for a fuel of known composition to identify a one or more constituents and/or concentrations thereof in the fuel. In one embodiment, the minimum emission ratio and/or the maximum rate-change emission ratio may be used to identify a composition of fuel.

In this way, feedback from the front and rear EGO sensors may be used to identify a composition of fuel combusted upstream of the TWC, and operation of the engine may be adjusted for the composition of the fuel. Note that while the above examples refer to using maximum or minimum values, various other ranges of values may be used.

FIGS. 3-6 below include graphs of exemplary data for various exhaust streams from the engine 10. In particular, the exemplary data includes index ratio curves based on feedback from the front and rear sensors and conversion inefficiencies for the TWC for exhaust streams of varied composition. Note that the performance of the TWC as shown in the graphs described herein may be in terms of conversion inefficiencies rather than efficiencies.

Figure 3:
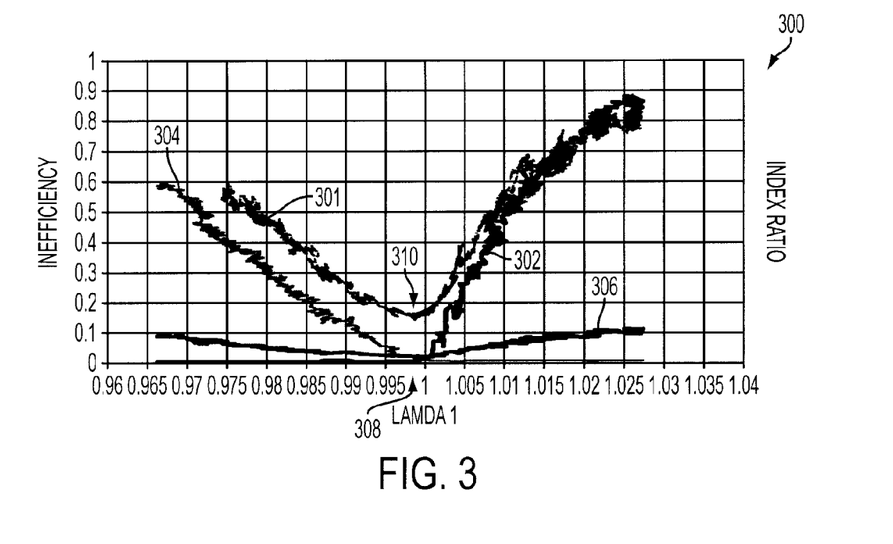
FIG. 3 is a graph including exemplary data at various air-fuel ratios for the combustion of iso-octane fuel.
Figure 4:
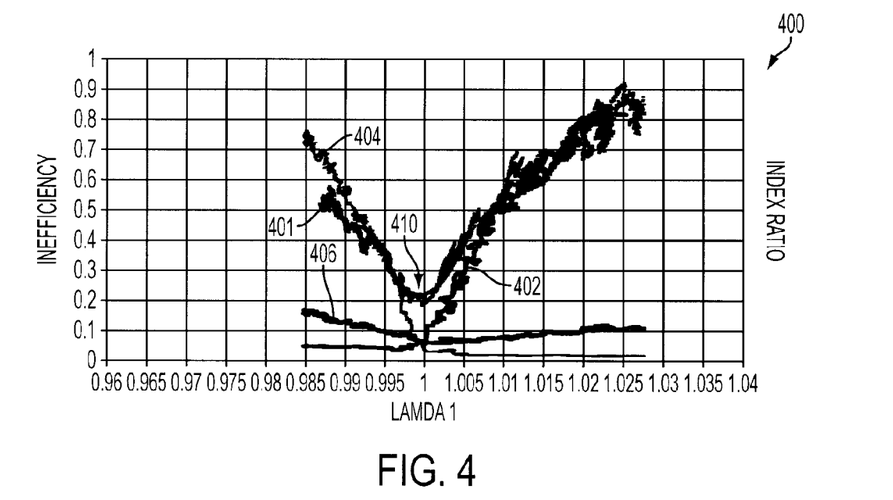
FIG. 4 is a graph including exemplary data at various air-fuel ratios for the combustion of 30-ppm sulfur containing fuel.

Turning first to FIG. 3 and FIG. 4, the graphs shown include exemplary data from the combustion of iso-octane fuel and that of fuel including 30-ppm sulfur based on feedback from the rear and front EGO sensors. In particular, graph 300 includes a UEGO index ratio curve 301 defining a minimum UEGO index ratio shown at 310 for iso-octane fuel, and graph 400 includes a UEGO index ratio curve 401 defining a minimum UEGO index ratio shown at 410 for fuel including 30-ppm sulfur. The graphs demonstrate that the minimum UEGO index ratio 310 for iso-octane fuel is lower than the minimum UEGO index ratio 410 for fuel including 30-ppm sulfur for the exemplary data shown in graph 300 and graph 400. As such, a minimum index ratio may be correlated to that of iso-octane fuel at minimum index ratios closer to that of minimum UEGO index ratio 310 and may be similarly correlated to fuel including 30-ppm sulfur at minimum index ratios closer to minimum UEGO index ratio 410. In this way, a composition of fuel may be identified based on the minimum UEGO index ratio defined by the curve, as described in method 200 above.

The data of graph 300 also demonstrates that conversion inefficiencies of NOx at 302, CO at 304, and HC at 306 at the TWC may be simultaneously reduced for an air-fuel ratio for the combustion of iso-octane at an air-fuel ratio indicated at 308. As demonstrated, higher conversion efficiencies at the TWC may be achieved at the air-fuel ratio corresponding to the minimum UEGO index ratio 310. In a similar way, the data of graph 400 demonstrates that conversion inefficiencies of NOx at 402, CO at 404, and HC at 406 at the TWC may be simultaneously minimized at the air-fuel ratio corresponding to a minimum UEGO index ratio shown at 410 of a UEGO index ratio curve 401 for the combustion of fuel including 30-ppm sulfur. As such, operation of the engine may be varied to provide an air-fuel ratio for the engine for higher conversion efficiencies of the TWC during operation of the engine in the near stoichiometric operation mode to concurrently convert NOx, CO, and HC in the exhaust.

The term "desired air-fuel ratio" may hereinafter refer to an air-fuel ratio for the engine to concurrently convert NOx, CO, and HC at higher conversion efficiencies of the TWC during operation of the engine in the near stoichiometric operation mode.

Feedback air-fuel ratio control may be used to vary fuel injection (or additional air via throttle or VCT) to provide air-fuel ratios, such as the desired air-fuel ratio, based on a predetermined feedback control set point to maximize or minimize certain functions. For example, a feedback control set point of 450 mV from the rear EGO sensor 124 may be used to provide the desired air-fuel ratio for increased conversion efficiency at the TWC. However, the set point for the desired air-fuel ratio may vary based on the composition of fuel combusted, as described below. Excessively rich or lean operation of the engine may result in reduced conversion efficiencies of emissions in the exhaust, reduced fuel economy, etc. Other conditions affecting the feedback control set point alternately or in addition to the composition of the fuel include, without limitation, the actual exhaust gas environment, degradation of the sensors, fuel contaminants, air leaks in the system, etc.

Figure 5:
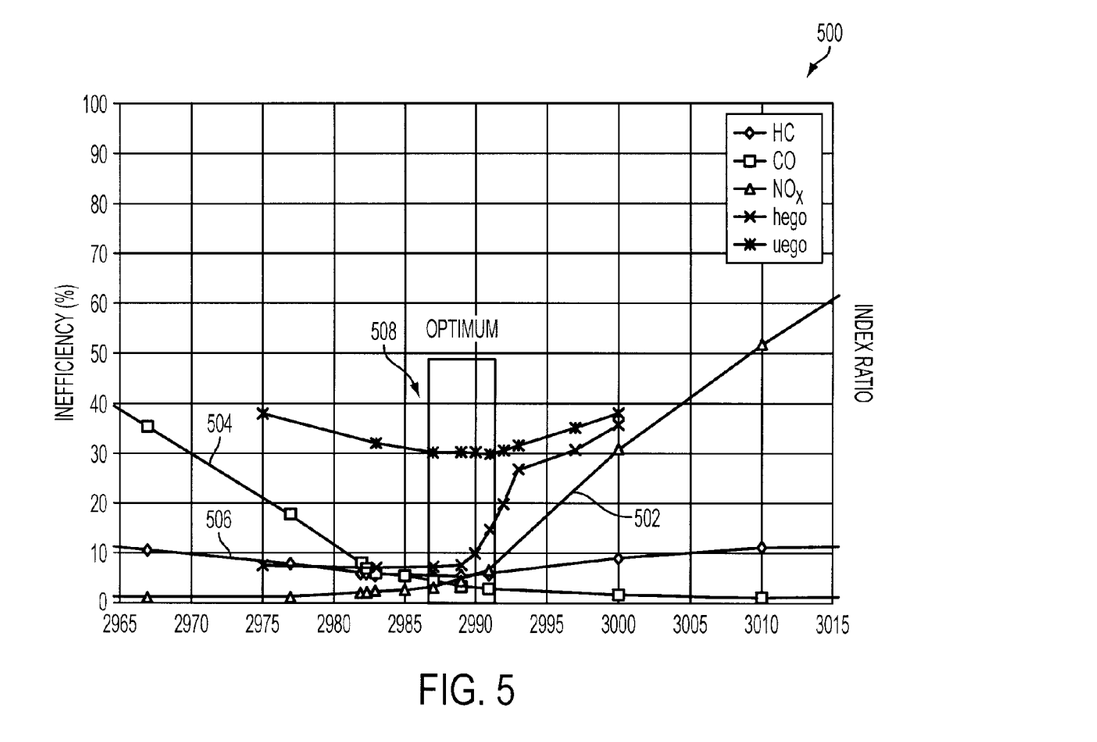
FIG. 5 is a graph including exemplary data for the combustion of iso-octane fuel at various feedback control set points.
Figure 6:
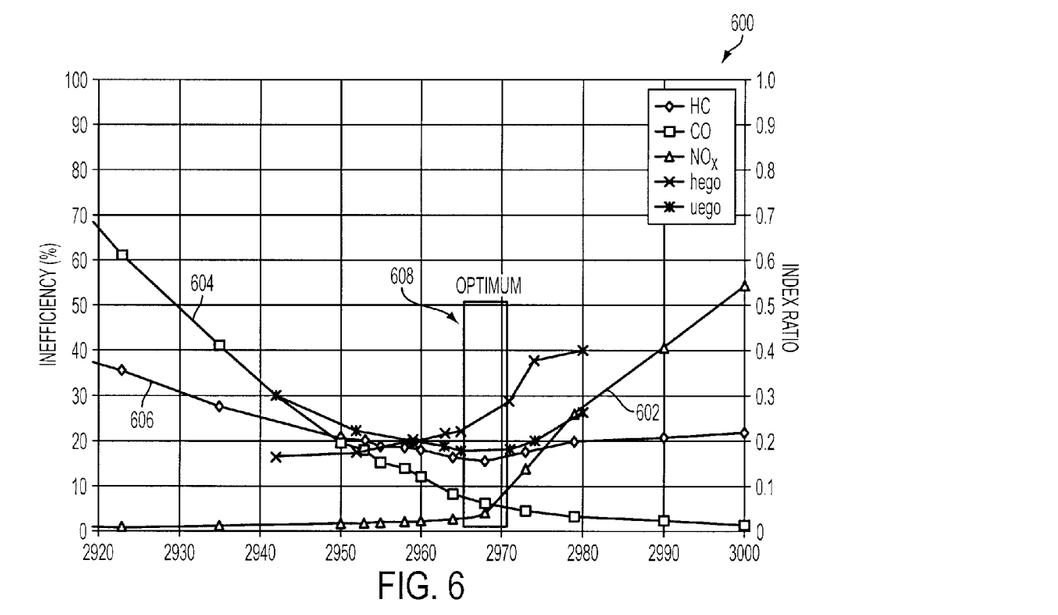
FIG. 6 is a graph including exemplary data for the combustion of E85 fuel at various feedback control set points.

Turning now to FIG. 5 and FIG. 6, the graphs shown include exemplary data for conversion inefficiencies of reactions in the TWC as the set point varies for the front sensor and further include UEGO and HEGO index ratio curves for the combustion of iso-octane fuel in graph 500 and for the combustion of E85 fuel (i.e. approximately 85% ethanol and 15% gasoline) in graph 600. The data of graph 500 demonstrates that conversion inefficiencies of NOx at 502, CO at 504, and HC at 506 at the TWC may be simultaneously minimized at feedback control set points for the desired air-fuel ratio within the boxed region at 508. In a similar way, the data of graph 600 demonstrates that conversion inefficiencies of NOx at 602, CO at 604, and HC at 606 at the TWC may be simultaneously minimized at feedback control set points for the desired air-fuel ratio within the boxed region at 608.

As shown, the minimum UEGO index ratio and the maximum rate-change HEGO index ratio both correspond to the set point for the desired air-fuel ratio (i.e. where NOx, CO, and HC may be concurrently converted at higher efficiencies). Therefore, the minimum UEGO index ratio and/or the maximum rate-change HEGO index ratio may be used to determine the actual set point for providing the desired air-fuel ratio for iso-octane at approximately 2988 mV, for example, and for E85 at approximately 2967 mV. Such set points may be determined for any suitable fuel and may also be determined for a plurality of fuels within a range of concentrations of ethanol.

Figure 7:
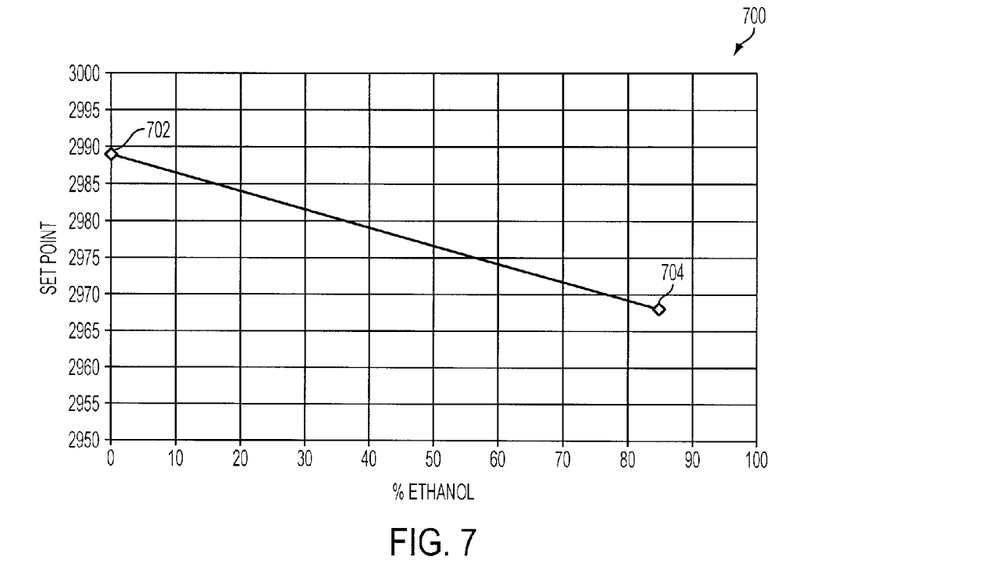
FIG. 7 is a graph including feedback control set points at desired air-fuel ratios for the combustion of fuel including various concentrations of alcohol.

FIG. 7 is a graph including control set points for the desired air-fuel ratio determined for a plurality of fuels within a range of known ethanol concentrations. Graph 700 includes the iso-octane set point for the desired air-fuel ratio shown at 702 and the E85 set point for the desired air-fuel ratio shown at 704, as described in FIG. 5-6 above, and further shows the set point for the desired air-fuel ratio at other set points. The set points shown in graph 700 may be stored in the controller 12, for example, and used during engine operation. For example, during engine operation in near stoichiometric operation mode, the desired air-fuel ratio may be provided to the engine based on the set point corresponding to the minimum UEGO index ratio and/or the maximum HEGO rate-change index ratio whereby the controller 12 may identify a concentration of ethanol in the fuel based on the set point. Engine operation may be varied based on the concentration of ethanol.

Figure 8:
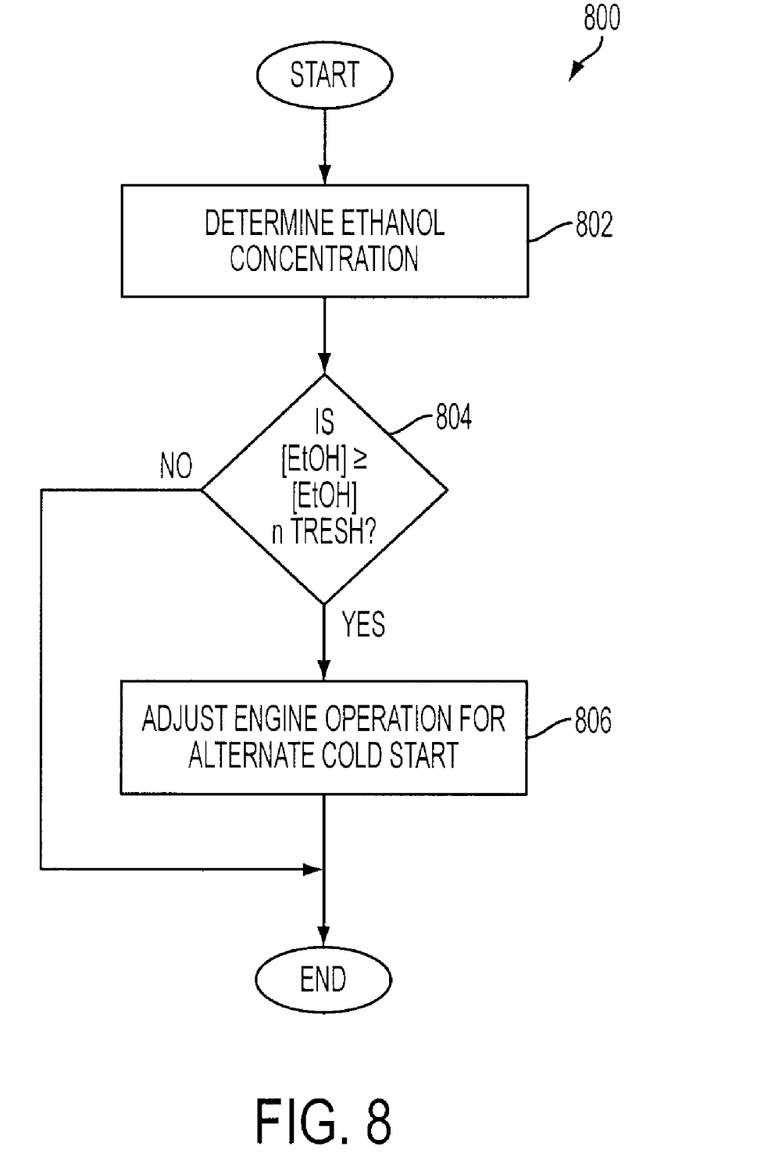
FIG. 8 is a flowchart of an exemplary process for operating an engine during a cold-start.

FIG. 8 is a flowchart of an exemplary process for operating the engine during cold-start based on the concentration of ethanol determined. In general, method 800 adjusts engine operation during engine cold-start with fuels including higher concentrations of ethanol.

Beginning at 802, method 800 includes determining the concentration of ethanol in the fuel. For example, the engine 10 may determine a minimum index ratio in a UEGO index ratio curve and identify a concentration of ethanol corresponding to the index ratio, as described above. Next, at 804, method 800 includes determining whether or not the concentration of ethanol identified exceeds a predetermined threshold of ethanol. If the answer at 804 is no, method 800 ends, and a default engine start-up process may proceed. If the answer at 806 is yes, method 800 continues to 806. At 806, engine operation may be adjusted to facilitate a start-up of the engine for higher concentrations of ethanol. Specifically, an alternate process may be used for fuels with higher ethanol concentrations to facilitate combustion at lower temperature conditions. Controller 12 may execute instructions to increase temperature conditions to facilitate combustion of ethanol and/or the decomposition of ethanol into hydrogen. For example, engine operating parameters, such as fuel injection (e.g., injection amount, injection pressure injection timing, direct injection, port fuel injection, etc.), spark timing, valve timing (e.g., charge motion control valves, intake manifold runner control valves, intake and/or exhaust valve timing), and vapor purge, may be varied for different mixtures of ethanol and gasoline.

Figure 9:
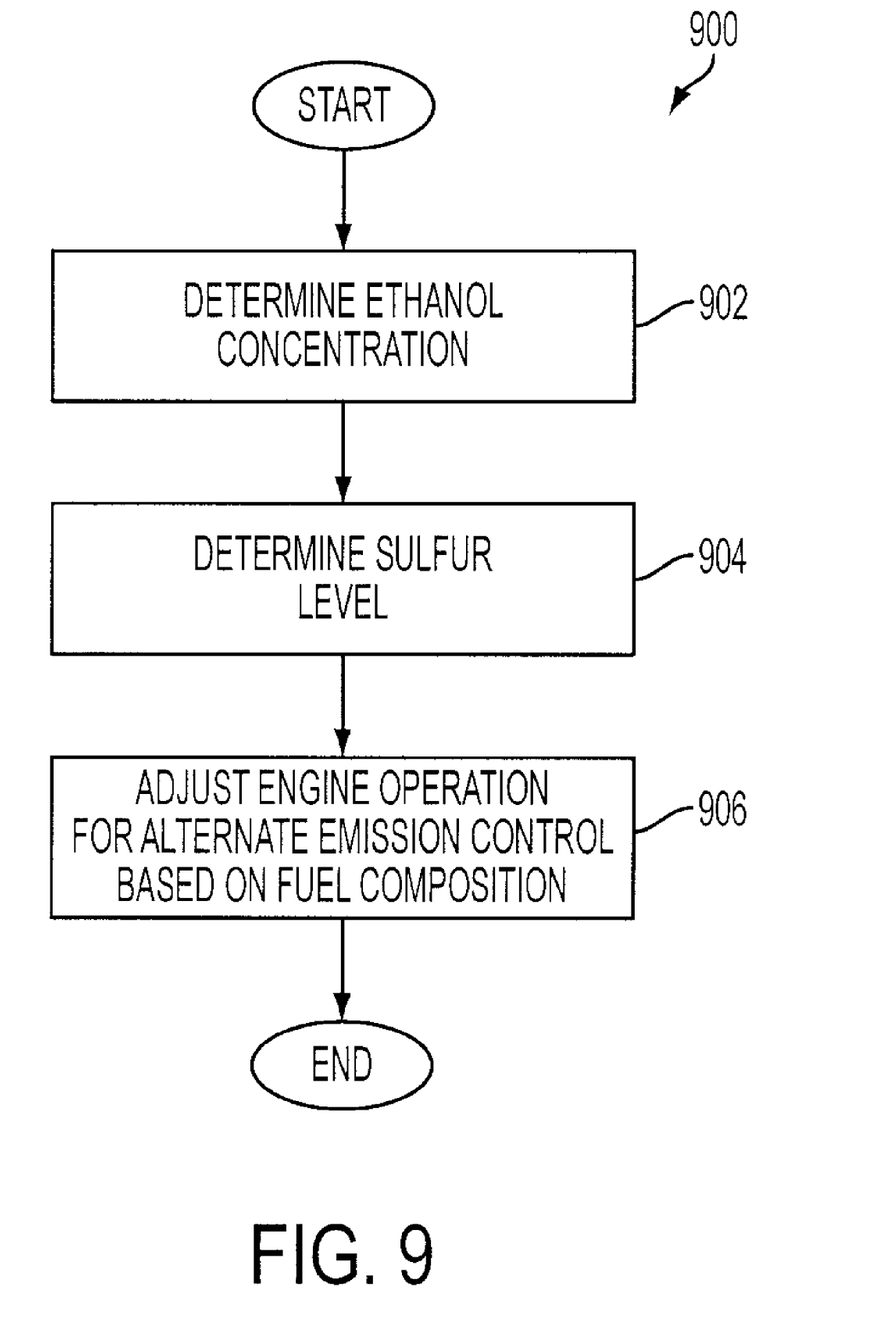
FIG. 9 is a flowchart of an exemplary process for operating an engine for various alternate emission control strategies based on fuel composition.

Engine operation may also be varied to facilitate alternate emission control based on the composition of the fuel. FIG. 9 is a flowchart of an exemplary process for operating the engine to control emissions based on the composition of the fuel. In general, method 900 adjusts engine operation to facilitate emission control of an exhaust from a combusted fuel based on the concentration of ethanol and sulfur in the fuel.

Method 900 begins at 902 to determine the concentration of ethanol in the fuel and then continues to 904 to determine the concentration of sulfur in the fuel. Specifically, the curve described above may be characterized to define a feature indicating a concentration of ethanol and another feature indicating a concentration of sulfur. In one example, the minimum UEGO index ratio may indicate a particular set point to identify a concentration of sulfur based on stored data, such as the data of FIG. 7. The range of air-fuel ratios or the range of set points of the UEGO index ratio curve may be characterized to indicate a particular level of sulfur. Referring back to FIG. 3-4, the graphs demonstrate that the range of air-fuel ratios for the iso-octane index ratio curve 301 may be wider than that for the 30-ppm index ratio curve 401. In particular, index ratios for fuels with reduced levels of sulfur may be calculated at richer air-fuel ratios than those for fuels with increased levels of sulfur as a result of the oxidation of CO and HC at reduced conversion efficiencies caused by sulfur poisoning of the TWC. Data for various levels of sulfur indicating ranges of air-fuel ratios and/or set points may also be stored in the controller 12 and used to identify the composition of the fuel in a manner similar to that of the graph of FIG. 7.

Continuing to 906, method 900 includes adjusting engine operation for alternate emission control of the engine based on the composition of the fuel. Under some conditions, an exhaust stream from the engine may be directed through various aftertreatment devices based on the composition of the combusted fuel. Exhausts from the combustion of fuels containing higher levels of sulfur may be rerouted to mitigate exposure of sulfur-sensitive devices to the exhaust. For example, controller 12 may execute instructions to reduce flow through a lean NOx trap and/or a non-nickel or reduced nickel three-way catalyst to reduce sulfur poisoning. Alternate emission control methods may include increasing flow through an EGR loop or through various other emission control devices. In another example, sulfur estimation methods may be adjusted based on the concentration of ethanol and/or sulfur in the identified composition of fuel. In this way, the emission control system may be adapted to process exhaust streams from the combustion of various fuel compositions.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

It will be appreciated that the configurations and routines disclosed herein are exemplary in nature, and that these specific embodiments are not to be considered in a limiting sense because numerous variations are possible. The subject matter of the present disclosure includes all novel and nonobvious combinations and subcombinations of the various system and exhaust configurations, algorithms, and other features, functions, and/or properties disclosed herein. The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating an engine with an emission control system including a catalyst, a first air-fuel-ratio sensor positioned upstream of the catalyst, and a second air-fuel-ratio sensor positioned downstream of the catalyst, comprising:
   varying engine air-fuel ratio; and
   identifying a sulfur concentration of combusted fuel responsive to variation of an index ratio of arc lengths of the first and second air-fuel-ratio sensors indicative of variation in catalyst performance across the varying engine air-fuel ratios.

2. The method of claim 1, further comprising adjusting a feedback control set point of an air-fuel ratio for the engine based on an identified fuel composition, and where the identified fuel composition includes an alcohol amount.

3. The method of claim 1, further comprising
   characterizing a curve based on a plurality of index ratios calculated at a plurality of air-fuel ratios for the engine.

4. The method of claim 3, where the characterizing of the curve includes characterizing a minimum of the curve, and where the fuel composition is identified based on the minimum of the curve.

5. The method of claim 3, where the characterizing of the curve includes characterizing a maximum rate of change of the curve, and where the fuel composition is identified based on the maximum rate of change of the curve.

6. The method of claim 3, where the identified fuel composition includes an ethanol content.

7. The method of claim 3, where the curve is characterized to define a first feature indicating a concentration of ethanol and a second feature indicating a concentration of sulfur.

8. The method of claim 1, further comprising reducing a flow of exhaust through the catalyst based on the fuel composition.

9. The method of claim 2, further comprising, during a cold-start of the engine, operating the engine in an alternate start-up mode based on the fuel composition, where the alcohol includes ethanol.

10. An emissions control system for an on-road vehicle having an engine and associated exhaust gas path, the system comprising:
    a catalyst coupled to the exhaust gas path;
    a front exhaust gas oxygen sensor coupled to the exhaust gas path upstream of the catalyst and configured to measure oxygen content in exhaust gas from the engine upstream of the catalyst;
    a rear exhaust gas oxygen sensor positioned adjacent to or downstream of the catalyst and configured to measure oxygen content in exhaust gas from the engine; and
    a controller coupled to the engine and configured to receive feedback from the front and rear exhaust gas oxygen sensors, to calculate an index ratio of respective arc lengths of the received feedback from the front and rear exhaust oxygen sensors, and to identify a concentration of a constituent in the fuel based on the index ratio, and where the controller is further configured to adjust a feedback control set point of an air-fuel ratio of the engine in response to the concentration of the constituent in the fuel.

11. The system of claim 10, where the front and rear sensors are configured to send a linear universal exhaust gas oxygen (UEGO) signal.

12. The system of claim 10, where the front and rear sensors are configured to send a heated exhaust gas oxygen (HEGO) signal.

13. The system of claim 10, where the catalyst is a three-way catalyst (TWC), and where the controller characterizes a curve based on a plurality of index ratios that is characterized to define a first feature indicating a concentration of ethanol and a second feature indicating a concentration of sulfur.

14. The system of claim 13, where the three-way catalyst (TWC) is a non nickel-containing catalyst.

15. The system of claim 10, further comprising a nitrogen oxide (NOx) adsorbent.

16. A method for operating an engine and an emission control system downstream of the engine, the emission control system including a catalyst, an exhaust gas path coupling the engine to the catalyst, a front exhaust gas oxygen (EGO) sensor positioned upstream of the catalyst and a rear exhaust gas oxygen (EGO) sensor positioned adjacent to or downstream of the catalyst, the method comprising:
    characterizing a curve from a plurality of index ratios produced from the front and rear exhaust oxygen sensors, where the curve includes at least one of a minimum at a minimum emission ratio and a maximum rate of change at a maximum rate-change emission ratio;
    adjusting a feedback control set point of an air-fuel ratio for the engine based on a control emission ratio, where the control emission ratio is the minimum emission ratio or the maximum rate-change emission ratio; and
    identifying a concentration of a constituent in fuel combusted in the engine based on the curve.

17. The method of claim 16, wherein the constituent is ethanol.

18. The method of claim 17, further comprising generating a look-up table, where the look-up table includes a feedback control set point correlated to a plurality of concentrations of ethanol.

* * * * *